UNITED STATES PATENT OFFICE.

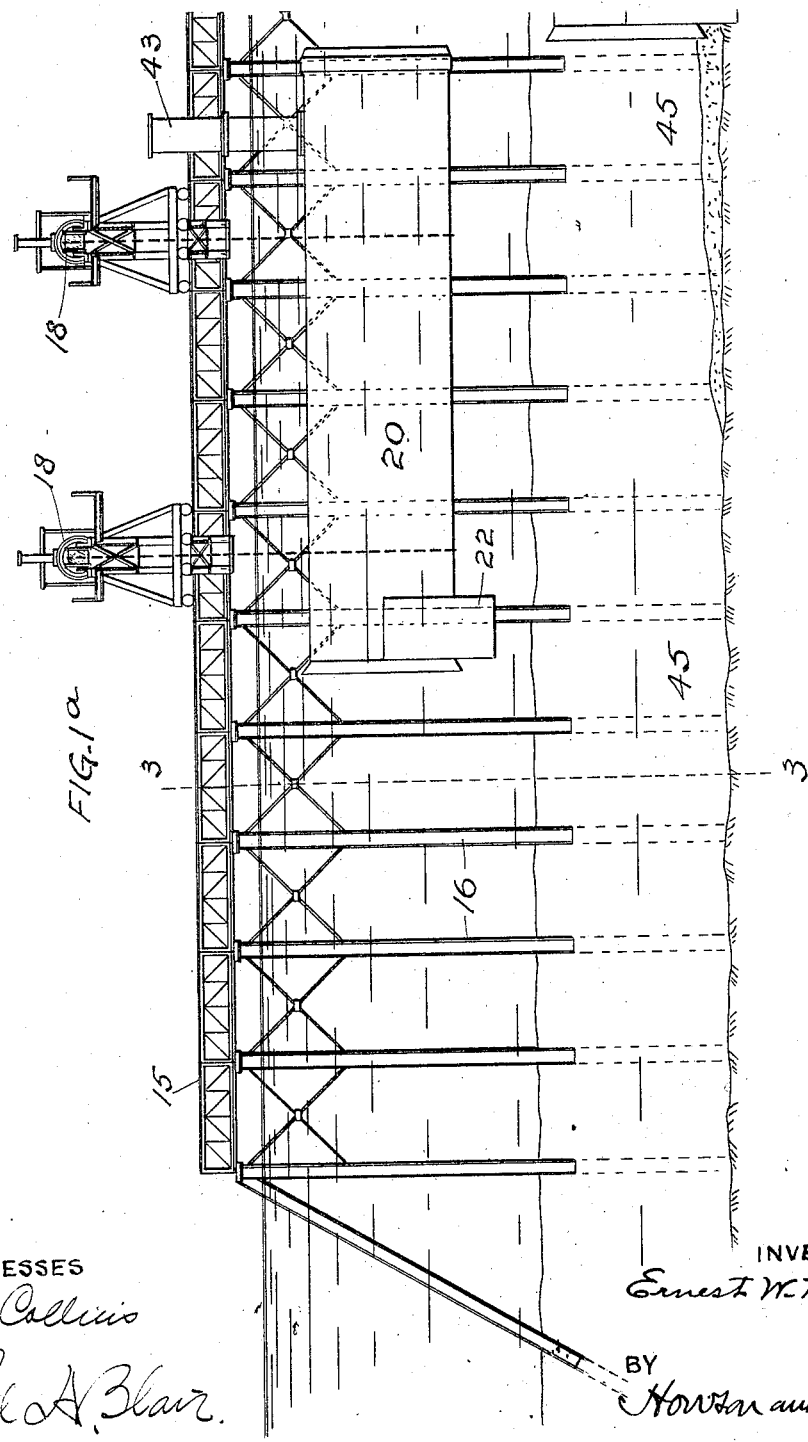

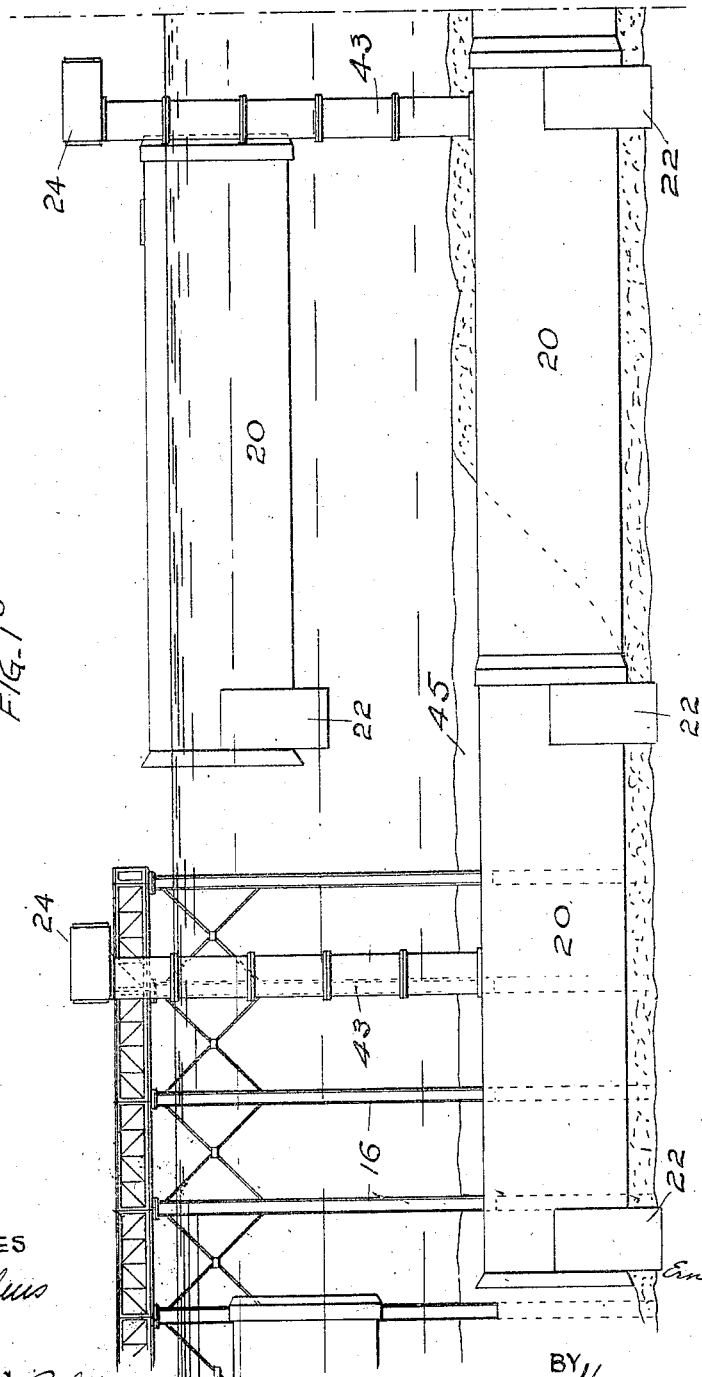

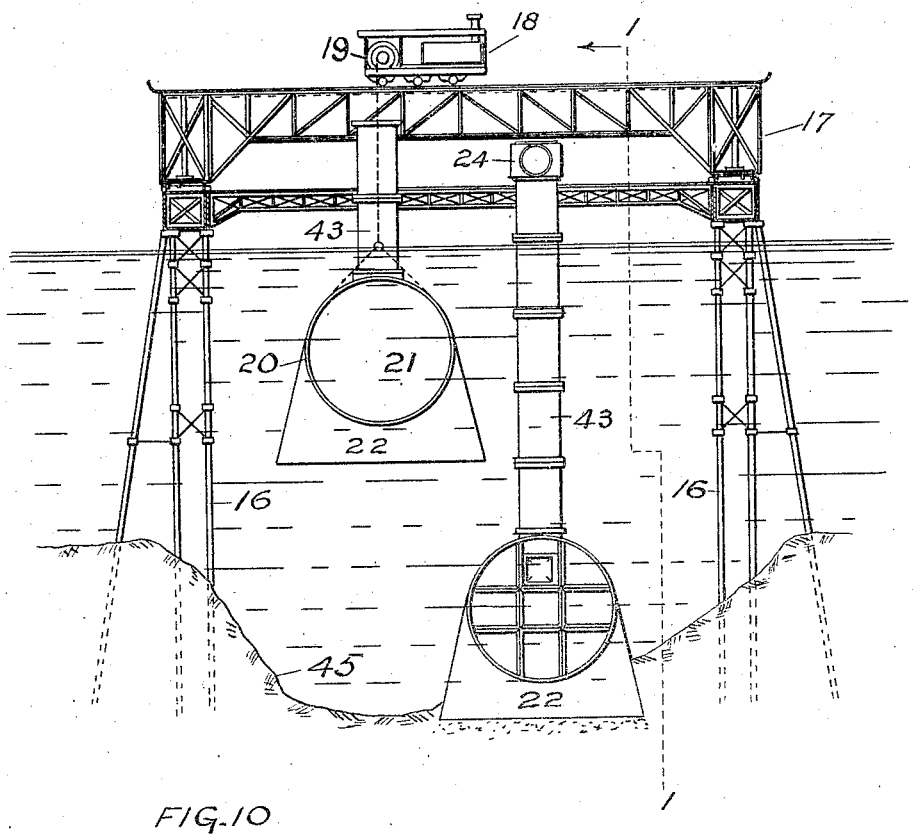
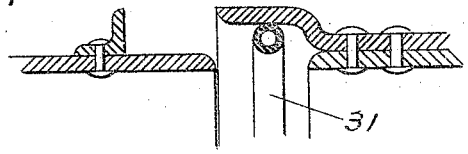
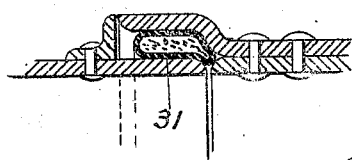

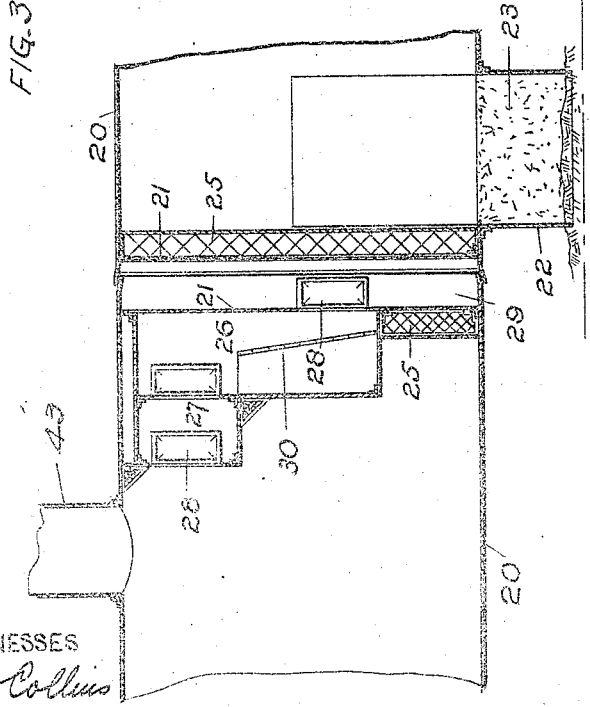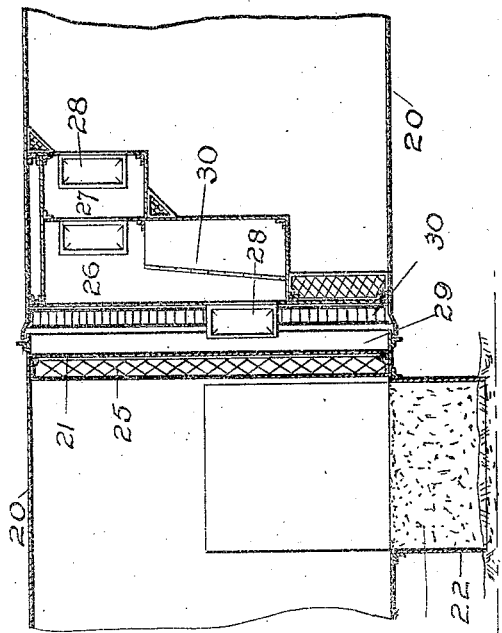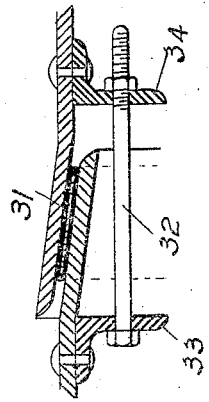

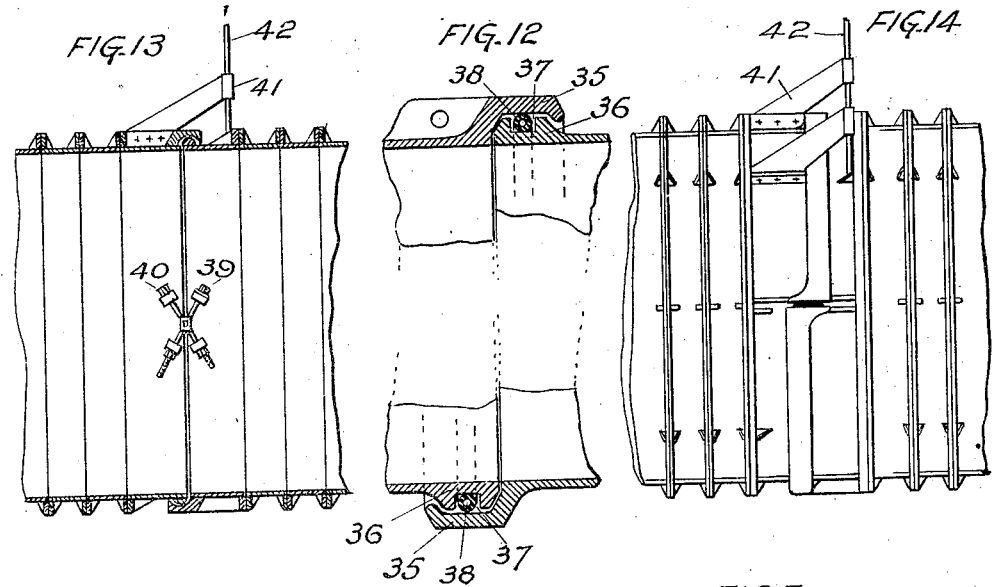

ERNEST W. MOIR, OF LONDON, ENGLAND.

SUBAQUEOUS TUNNEL.

938,265.  Specification of Letters Patent.  Patented Oct. 26, 1909.

Application filed March 10, 1906. Serial No. 305,318.

*To all whom it may concern:*

Be it known that I, ERNEST W. MOIR, a subject of the King of Great Britain and Ireland, and residing in the city of London, England, have invented certain new and useful Improvements in Subaqueous Tunnels, of which the following is a specification.

My invention relates to improvements in subaqueous tunnels and particularly that class of subaqueous tunnels which are formed from a series of tubular sections, each one built on land and then put in position and connected with the previously laid section, as will be more fully described hereafter.

It is the object of my invention to facilitate the construction of such tunnels without recourse to the costly process of underground excavation, or "tunnel driving," and in so doing to provide an improved construction of each section or tube with the means whereby it may be more easily and permanently connected with the adjacent sections.

Figure 15:
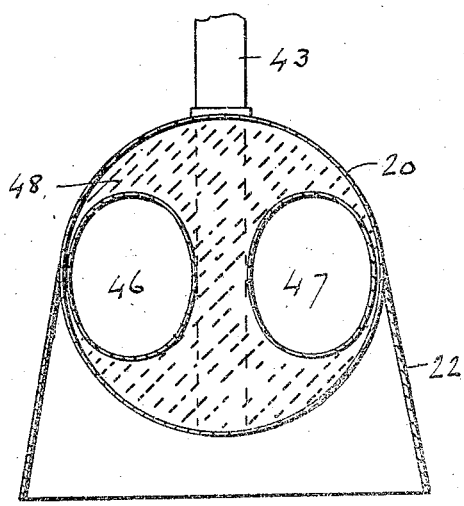
Figure 16:
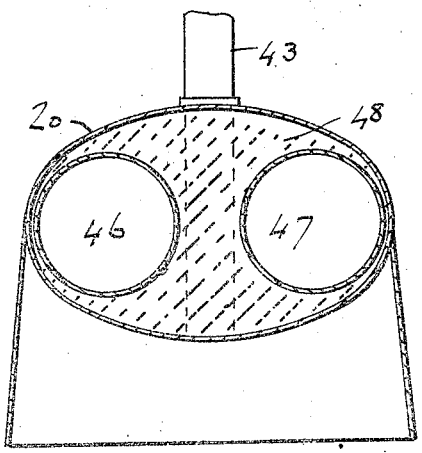
Figure 17:
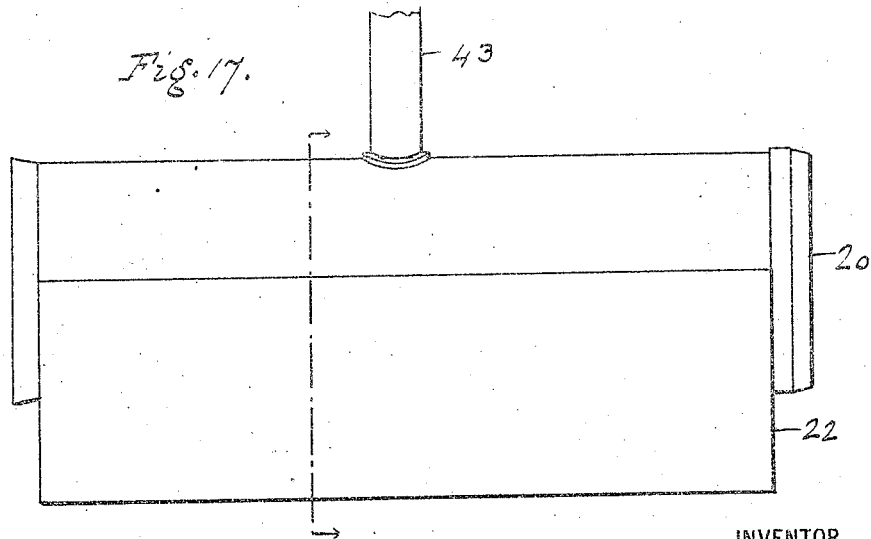

In the accompanying drawings Figures 1ª and 1ᵇ show my apparatus in vertical section taken on the line 1—1, Fig. 2; Fig. 2 shows the apparatus in cross-sectional elevation; Fig. 3 is a longitudinal sectional view showing the construction of one section partly broken away with the adjacent sections in connected position; Figs. 4 and 5, 6 and 7, 8 and 9, and 10 and 11, show in sectional detail various ways of making the joint between adjacent sections; Fig. 12 shows in sectional detail a further modification; and Figs. 13 and 14 show a sectional view and an exterior elevation respectively with the means for connecting and calking the sections according to the modifications shown in Fig. 12; Figs. 15 and 16 are end views showing modified forms of sections with double passageways; and Fig. 17 is a side view of a section having modified form of caisson.

Referring to these drawings, particularly Figs. 1ª and 1ᵇ, and Fig. 2, 15 represents a temporary staging spanning the proposed course of the tunnel and supported on piles 16 driven into the bed of the river, or the like, under which the tunnel is to pass. This staging may be of any suitable construction of sufficient strength to support the loads which it is intended to carry, and being of temporary construction, it may be removed as the tunnel is completed and erected again in advance or along the prospective tunnel way. Running longitudinally on each side of the upper part of this staging is a track supporting the ends of two or more traveling cranes 17.

Each crane has a hoisting means 19 mounted on a carriage 18 capable of being traversed on a track on the lower carriage, and at right angles thereto. This coördinate arrangement of cranes provides means whereby a tunnel section 20, after being floated into the position desired, can be then accurately lowered into place. Each section 20 is constructed on land and launched at the place most convenient in very much the same way as a boat. A suitable bulkhead 21 is provided at each end to make the tunnel watertight. The tunnel is then towed to the vicinity of the place where it is to be used.

Previous to erecting the staging 15, a large trench 45 is dredged in the bed of the river, as indicated in Fig. 2, to receive the tunnel sections. If desired dredging means may be carried on the forward end of the staging in advance of the cranes 17.

The hoisting cables from the cranes 19 are passed under the section or attached to its sides, and then the section is moved by the cranes 17 to a place above the end of the last section laid. The buoyancy of the section is then reduced by loading, or otherwise, and it is sunk and moved into position.

Each section is provided with a caisson 22 near its end, or in some cases at each end, as will presently be explained. This enables the bottom to be prepared and the section brought to the proper grade, after which the caisson is filled as at 23 with concrete or the like, forming a firm foundation for the tunnel.

Each section is connected with the surface by a shaft and air lock 24 for supplying the necessary materials, and to maintain the air pressure, as well as to enable the workmen to pass up and down. This shaft may be built up from a series of tubes as the tunnel section is being lowered. The size of these sections may vary as desired. Figs. 15 and 16 show modified forms of sections, provided with two passages for traffic in opposite directions. The outer tube may be round or oval. Between this and the two inner tubes 46 and 47 cement 48 is preferably filled in. The air shaft 43 connects with the caisson by passing down between the tubes.

As illustrated in Fig. 3, all the sections used in constructing the tunnel are not of exactly the same style. In the first place the central section shown, for example, is provided with two caissons 22, one near each end, which support not only the ends of that section but the ends of the adjacent sections. In the second place, this section is provided with a temporary bulkhead 21 at each end, which is strengthened to withstand the end pressure by girders 25 on the inside. The bulkheads of the adjacent sections are each provided with double air lock chambers 26, 27, in the upper part, with connecting doors 28 to enable a diver to pass into the space 29 between the two tunnel sections. Suitable ladders 30 are placed where necessary to enable the divers to conveniently reach all parts. If preferred this caisson may extend the entire length of the section as shown in the modification, Fig. 17.

My preferred form of joint between the sections is of the spigot style, for example, such a is shown in Figs. 4 and 5. After a section is lowered into place it is moved into approximate position (Fig. 4) and a hollow tube of rubber or other elastic material 31 is placed between the large and small ends of the two sections. This tube may be expanded by introducing air under pressure and then may be filled under hydraulic pressure with cement or the like while still in its plastic condition (Fig. 5). The cement hardens in that form and the joint is permanently calked. The bolts 32, if used as in Fig. 5, are then applied to the interior flanges 33, 34, in as many places as necessary and the two sections are then fixedly secured. The same principle applies where the flanges are on the outside as Figs. 8 and 9, or where the bolts are not used as in Figs. 10 and 11. As these bolts are put in place, preferably beginning with the upper part of the tunnel, the water in the space 29 is gradually pumped out through the locks 26, 27, and such further calking as is necessary is done, the pressure being increased as the water is drawn off. When the joint is made watertight all around, the bulkheads and air locks may be removed and communication established with the completed part of the tunnel.

The insides of the sections are preferably lined with cement, and if desired, cement or the like may be applied to the outside completely covering the tunnel.

The modification shown in Figs. 12, 13, and 14 has another style of joint, which may be used. Instead of the spigot connection, half of the end of each section is provided with a projecting grooved flange 35 adapted to engage a ridge 36 on the corresponding half of the adjacent section. Each ridge is provided with a groove 37 adapted to hold an elastic calking tube 38, as was explained in describing the other connections. These sections may be secured by means of cross-bolts 39 and 40 (Fig. 13) applied to the ends of adjacent sections. The exterior of this connection with the calking material 38 is shown. Guides 41 are applied to one section to slide on guide rods 42 secured on the adjacent section. This enables the section to be placed in exact position at once. These sections are, of course, supplied with the necessary bulkheads and caissons as shown in connection with the other figures.

I claim as my invention—

1. A tunnel section used in the construction of subaqueous tunnels, comprising a tube having a bulkhead near each end, girders for supporting the bulkhead, and air lock means for passing through the bulkhead.

2. A tunnel section used in the construction of subaqueous tunnels, comprising a tube having a bulkhead near each end, the end of said section adapted to engage the corresponding end of an adjacent similar section, and air lock means whereby the space between the bulkheads may be entered.

3. A tunnel section used in the construction of subaqueous tunnels, comprising a tube having a bulkhead near each end, the end of said section adapted to engage the corresponding end of an adjacent similar section, and air lock chambers on the inside of one of the bulkheads whereby the space between the bulkheads of adjacent sections may be entered.

4. A tunnel section used in the construction of subaqueous tunnels, comprising a tube having a bulkhead near each end with an air lock in one bulkhead, the end of said section adapted to engage the corresponding end of an adjacent similar section, one end being smaller and fitting within the larger end of the adjacent section.

5. A tunnel section used in the construction of subaqueous tunnels, comprising a tube having a bulkhead near each end with an air lock in one bulkhead, the end of said section adapted to engage the corresponding end of an adjacent similar section, one end being smaller and fitting within the larger end of the adjacent section, and means whereby the joint is calked as the sections are brought together.

6. A tunnel section used in the construction of subaqueous tunnels, having a caisson on its underside, a shaft communicating between the interior of the section and the atmosphere, and an air lock in said shaft.

7. A tunnel comprising sections which have bulkheads near their ends, the end of one section adapted to engage the next, means for making a tight joint between adjacent sections and air lock means whereby the spaces between bulkheads may be entered.

8. A subaqueous tunnel, having its sections joined with calked joints, the calking consisting of a hollow flexible tube filled with cement or the like.

9. A subaqueous tunnel, having its sections joined with spigot joints, the calking consisting of a hollow flexible tube filled with cement or the like.

In testimony whereof I have signed my name to this specification, in the presence of two subscribing witnesses.

ERNEST W. MOIR.

Witnesses:
LOUIS PH. GEYER,
HENRY JAPP.